(12) United States Patent
Lee

(10) Patent No.: US 10,657,907 B2
(45) Date of Patent: May 19, 2020

(54) CALCULATION METHOD FOR VIEWING-ANGLE COMPENSATION OF DISPLAY DEVICE, VIEWING-ANGLE COMPENSATION STRUCTURE, AND DISPLAY DEVICE

(71) Applicants: HKC Corporation Limited, Shenzhen, Guangdong (CN); Chongqing HKC Optoelectronics Technology Co., Limited, Chongqing (CN)

(72) Inventor: Chia-Hang Lee, Chongqing (CN)

(73) Assignees: HKC CORPORATION LIMITED, Shenzhen, Guangdong (CN); CHONGQING HKC OPTOELECTRONICS TECHNOLOGY CO., LTD., Chongqing (CN)

(*) Notice: Subject to any disclaimer, the term of this patent is extended or adjusted under 35 U.S.C. 154(b) by 70 days.

(21) Appl. No.: 15/580,301

(22) PCT Filed: Sep. 19, 2017

(86) PCT No.: PCT/CN2017/102232
§ 371 (c)(1),
(2) Date: Dec. 7, 2017

(87) PCT Pub. No.: WO2019/041398
PCT Pub. Date: Mar. 7, 2019

(65) Prior Publication Data
US 2019/0221173 A1 Jul. 18, 2019

(30) Foreign Application Priority Data
Aug. 28, 2017 (CN) .......................... 2017 1 0750902

(51) Int. Cl.
G09G 3/36 (2006.01)
G06F 3/14 (2006.01)
(Continued)

(52) U.S. Cl.
CPC ......... G09G 3/3607 (2013.01); G02F 1/1323 (2013.01); *G09G 2310/0243* (2013.01);
(Continued)

(58) Field of Classification Search
CPC ........ G02F 1/13306; G09G 3/20–3611; G09G 2310/0242–08
See application file for complete search history.

(56) References Cited

U.S. PATENT DOCUMENTS

| 5,818,925 A * | 10/1998 | Anders | G09G 3/36 379/396 |
| 2006/0145978 A1* | 7/2006 | Takatori | G09G 3/2014 345/87 |

(Continued)

FOREIGN PATENT DOCUMENTS

| CN | 102237025 A | 11/2011 |
| CN | 103748627 A | 4/2014 |

(Continued)

OTHER PUBLICATIONS

International Search Report dated May 22, 2018, in the corresponding PCT application PCT/CN2017/102232, 9 pages in Chinese.

*Primary Examiner* — Lin Li
(74) *Attorney, Agent, or Firm* — Juan Carlos A. Marquez; Marquez IP Law Office, PLLC

(57) ABSTRACT

A calculation method for viewing-angle compensation of a display device, a viewing-angle compensation structure, and a display device is disclosed. The method includes: measuring tristimulus values for red, green, and blue displayed in grayscale of a display device in a viewing angle and a (Continued)

luminance gamma curve; calculating a central viewing angle, a first viewing angle, and a second viewing angle of an observation viewing angle of the display device, to obtain a viewing angle range of the observation viewing angle; obtaining a display look-up table (LUT) by using an angle of the viewing angle and the luminance gamma curve and according to a viewing angle algorithm; then obtaining a viewing-angle compensation value by using the central viewing angle and the viewing angle range and according to the display LUT; and eventually adjusting the corresponding tristimulus values in the display device according to the viewing-angle compensation value.

14 Claims, 5 Drawing Sheets

(51) Int. Cl.
 *G09G 3/20* (2006.01)
 *G02F 1/13* (2006.01)
(52) U.S. Cl.
 CPC ... *G09G 2310/08* (2013.01); *G09G 2320/028* (2013.01); *G09G 2320/0242* (2013.01); *G09G 2320/0673* (2013.01); *G09G 2320/0693* (2013.01); *G09G 2360/16* (2013.01)

(56) References Cited

U.S. PATENT DOCUMENTS

| | | | | |
|---|---|---|---|---|
| 2008/0088649 | A1* | 4/2008 | Ikeno | G09G 3/3611 345/690 |
| 2008/0143755 | A1* | 6/2008 | Sung | G09G 3/3611 345/690 |
| 2009/0009455 | A1* | 1/2009 | Kimura | G09G 3/2074 345/89 |
| 2009/0309903 | A1 | 12/2009 | Park et al. | |
| 2013/0194170 | A1* | 8/2013 | Saitoh | G09G 3/20 345/103 |
| 2017/0031434 | A1* | 2/2017 | Files | G06F 3/1431 |
| 2018/0018938 | A1* | 1/2018 | Lee | G09G 3/2074 |

FOREIGN PATENT DOCUMENTS

| | | |
|---|---|---|
| CN | 105388649 A | 3/2016 |
| EP | 1553553 A2 | 7/2005 |

\* cited by examiner

CALCULATION METHOD FOR VIEWING-ANGLE COMPENSATION OF DISPLAY DEVICE, VIEWING-ANGLE COMPENSATION STRUCTURE, AND DISPLAY DEVICE

BACKGROUND

Technical Field

This application relates to the display field, and in particular, to a calculation method for viewing-angle compensation of a display device, a viewing-angle compensation structure, and a display device.

Related Art

Currently, an image processing technology is to divide a display area of a liquid crystal panel into many pixels, and each pixel has subpixels having three primary colors: red, green, and blue. All colors of visible light can be generated by mixing red light, green light, and blue light, so that a color to be presented by a pixel may be created by controlling the brightness of sub pixels of red, green, and blue. Moreover, to describe the color more appropriately, the International Commission on Illumination (CIE) proposes a CIE 1931 XYZ color space (CIE XYZ Color Space). Red, green, and blue are used as three primary colors in the color space. All other colors can be generated by mixing the three primary colors. All colors have tristimulus values X, Y, and Z, and different colors are displayed using different proportions of three primary colors.

A liquid crystal display (LCD) is a display device with flat and ultra-thin, is formed of a particular quantity of colorful pixels or white and black pixels, and is disposed in front of a light source or a reflector. The LCD has low power consumption, and becomes mainstream displays for the characteristics of high image quality, a small volume, and a light weight. The LCD has been widely used in various electronic products, for example, computer devices with display screens, mobile phones or digital photo frames. At present, a development priority for the LCD is a wide-viewing angle technology. However, a color shift phenomenon usually occurs in a wide-viewing angle technology LCD when a side viewing angle is excessively large.

As screens of displays are becoming increasingly large, a viewing angle feature of the displays becomes an important indicator for color quality of the displays. Generally speaking, a viewing angle color difference of a Vertical Alignment (VA) LCD is greater than an In-Plane Switching (IPS) LCD because different of birefringence effects of liquid crystals. As a result, as compared with an IPS panel, in an off-axis case, a picture of the VA LCD easily has a color washout.

Therefore, a viewing-angle compensation technology is very important for a VA display, including compensation for an azimuth angle ($\Psi$: 0 degree to 360 degrees) and compensation for a solid angle ($\theta$: 90 degrees to −90 degrees). Generally, a VA display uses a multi-domain pixel design technology to achieve an objective of viewing-angle compensation. The viewing-angle compensation may further include 4-domain pixel compensation, 8-domain pixel compensation or pixel compensation for more than 8 domains. The 4-domain pixel compensation is usually used to compensate for an azimuth angle of a display, and a design of the pixel compensation for more than 8 domains is then used to compensate for a solid angle.

Generally, in a technology of using a multi-domain pixel design to compensate for an azimuth angle and a solid angle of a display, a sub-domain inside a sub-pixel requires to be used, and different liquid crystal operating voltages require to be set. There are usually a bright area and a dark area. However, to implement area control, one more voltage divider capacitor requires to be designed or one more active array switch requires to be designed for independent control. As a result, an aperture ratio of overall pixels is reduced.

SUMMARY

To resolve the foregoing technical problem, this application provides a viewing-angle compensation algorithm for displays, so that viewing angle characteristics of the displays can be optimized. As liquid crystal displays become increasingly large, observation angles of a user at different positions are different, and even if the user is at a particular position, a viewing angle of the user relative to a screen already covers more than one angle ($\theta_L$ and $\theta_R$). Generally, a viewing-angle compensation algorithm technology is used to perform color compensation for a viewing angle, and viewing angles from other angles relatively have errors. Therefore, this application provides an optimized viewing-angle compensation technology. The optimized viewing-angle compensation technology can compensate for viewing angle characteristics of a plurality of angles, and can perform optimal viewing-angle compensation by means of this application regardless of the size of a display.

An objective of this application is achieved and a technical problem in this application is resolved by using the following the technical solution. A technology for compensating for a viewing angle by using an algorithm provided in this application comprises the following steps:

first, measuring tristimulus values for red, green, and blue displayed in grayscale of a display device in a viewing angle and a luminance gamma curve; calculating a central viewing angle, a first viewing angle, and a second viewing angle of an observation viewing angle of the display device, to obtain a viewing angle range of the observation viewing angle; obtaining a display look-up table (LUT) by using Ian angle of the viewing angle and the luminance gamma curve and according to a viewing angle algorithm; then obtaining a viewing-angle compensation value by using the central viewing angle and the viewing angle range and according to the display LUT; and eventually adjusting the corresponding tristimulus values in the display device according to the viewing-angle compensation value.

In an embodiment of this application, for the tristimulus values, all the tristimulus values for red, green, and blue displayed tin grayscale of the display device in the viewing angle are measured according to the CIE 1931 XYZ color space proposed by the CIE, and comprise $RX_m$, $RY_m$, $RZ_m$, $GX_l$, $GY_l$, $GZ_l$, and $BX_n$, $BY_n$, $BZ_n$, where m, l, and n=0, 1, 2, . . . , and 255.

In an embodiment of this application; the viewing angle comprises 0 degree, 15 degrees, 30 degrees, 45 degrees, 60 degrees, and 75 degrees, where the 0 degree viewing angle is a positive viewing angle.

In an embodiment of this application, the luminance gamma curve is a stimulus value Y of the tristimulus values.

In an embodiment of this application, the viewing angle range is a difference between the first viewing angle and the second viewing angle, where when the central viewing angle is obtained as a user faces the center of the display device, an angle at a longest distance from the display device is the first viewing angle, an angle at a nearest end from the display device is the second viewing angle, the first viewing angle is greater than the central viewing angle, and the central viewing angle is greater than the second viewing angle.

In an embodiment of this application, the display LUT corresponding to the viewing angle is calculated by using a calculation formula of the viewing angle algorithm and by introducing related parameters of the central viewing angle and the viewing angle range into the following formulas:

Gamma_H(0-degree)+Gamma_L(0-degree)
=2*Gamma2.2(0-degree), and

Min(Gamma_H(θ)+Gamma_L(θ)−2*Gamma2.2(0-degree)), where

Gamma_H is a luminance gamma curve of a high-voltage pixel, and

Gamma_L is a luminance gamma curve of a low-voltage pixel.

In an embodiment of this application, the display LUT calculates a LUT corresponding to a full display comprising the viewing angle by using interpolation.

The objective of this application may further be achieved and the technical problem in this application may further be resolved by using the following technical measure. A viewing-angle compensation structure provided in this application comprises a measurement module, a first calculation module, a second calculation module, an electrically-erasable programmable read-only memory (EEPROM), a timing controller (TCON), and a conversion module. The measurement module is configured to measure all tristimulus values for red, green, and blue displayed in grayscale of a display device in a viewing angle and a luminance gamma curve. The first calculation module is configured to calculate a central viewing angle, a first viewing angle, and a second viewing angle of an observation viewing angle of the display device, to obtain a viewing angle range of the observation viewing angle. The second calculation module is configured to obtain a display LUT by using an angle of the viewing angle and the luminance gamma curve and according to a viewing angle algorithm. The EEPROM is configured to store the display LUT. The TCON is configured to: obtain a viewing-angle compensation value according to the display LUT of the EEPROM, and generate a source signal. The conversion module is configured to convert the tristimulus values according to the source signal.

In an embodiment of this application, the first calculation module calculates a difference between the first viewing angle and the second viewing angle to obtain the viewing angle range, where when the central viewing angle is obtained as a user faces the center of the display device, an angle at a longest distance from the display device is the first viewing angle, an angle at a nearest end from the display device is the second viewing angle, the first viewing angle is greater than the central viewing angle, and the central viewing angle is greater than the second viewing angle.

In an embodiment of this application, the second calculation module calculates, by using a calculation formula of the viewing angle algorithm and by introducing related parameters of the central viewing angle and the viewing angle range into the following formulas, the display LUT corresponding to the viewing angle:

Gamma_H(0-degree)+Gamma_L(0-degree)
=2*Gamma2.2(0-degree), and

Min(Gamma_H(θ)+Gamma_L(θ)−2*Gamma2.2(0-degree)), where

Gamma_H is a luminance gamma curve of a high-voltage pixel, and

Gamma_L is a luminance gamma curve of a low-voltage pixel.

The objective of this application may further be achieved and the technical problem in this application may further be resolved by using the following technical measure. According to a display device provided in this application, the display device comprises a display panel, the display panel comprising a plurality of pixels, and configured to display an image, and a viewing-angle compensation structure, including comprises: a measurement module, configured to measure all tristimulus values for red, green, and blue displayed in grayscale of the display device in a viewing angle and a luminance gamma curve; a first calculation module, configured to calculate a central viewing angle, a first viewing angle, and a second viewing angle of an observation viewing angle of the display device, to obtain a viewing angle range of the observation viewing angle; a second calculation module, configured to obtain a display LUT by using an angle of the viewing angle and the luminance gamma curve and according to a viewing angle algorithm; an EEPROM, configured to store the display LUT; a TCON, configured to: obtain a viewing-angle compensation value according to the display LUT of the EEPROM, and generate a source signal; and a conversion module, configured to convert the tristimulus values according to the source signal.

This application provides an optimized viewing-angle compensation technology. The optimized viewing-angle compensation technology can compensate for viewing angle characteristics of a plurality of angles, and can perform optimal viewing-angle compensation by means of this application regardless of the size of a display.

BRIEF DESCRIPTION OF THE DRAWINGS

The disclosure will become more fully understood from the detailed description given herein below for illustration only, and thus are not limitative of the disclosure, and wherein.

DETAILED DESCRIPTION

Figure 1:
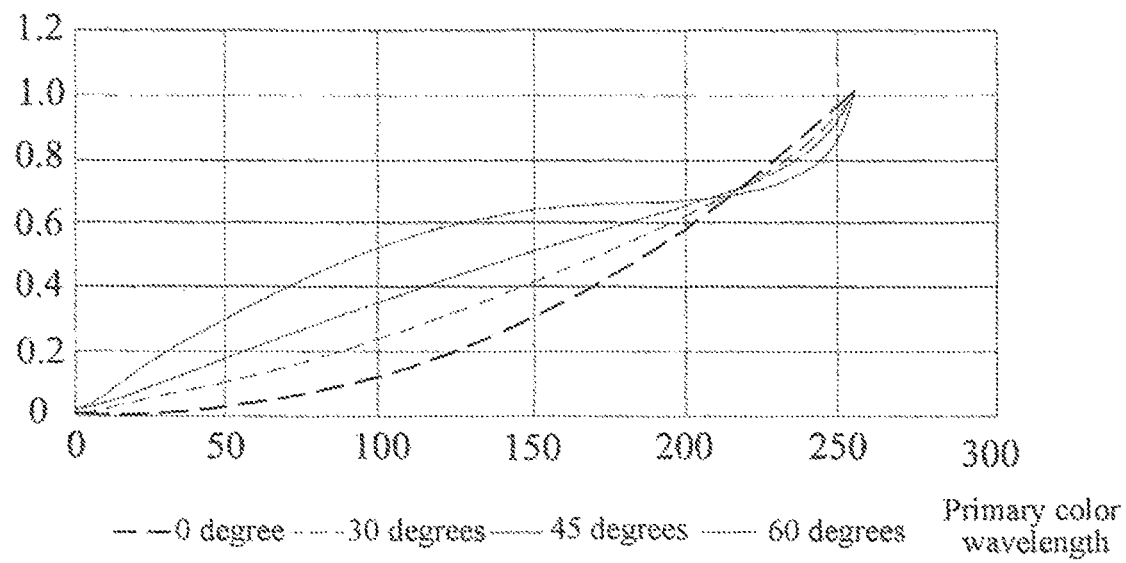
FIG. 1 is a schematic diagram of a luminance gamma curve in a calculation method for viewing-angle compensation of a display device according to an embodiment of this application.

The following embodiments are described with reference to the accompanying drawings, used to exemplify specific embodiments for implementation of this application. Terms about directions mentioned in this application, such as "on", "below", "front", "back", "left", "right", "in", "out", and "side surface" merely refer to directions in the accompanying drawings. Therefore, the used terms about directions are used to describe and understand this application, and are not intended to limit this application.

The accompanying drawings and the description are considered to be essentially exemplary, rather than limitative. In the figures, modules with similar structures are represented by using a same reference numeral. In addition, for understanding and ease of description, the size and the thickness of each component shown in the accompanying drawings are arbitrarily shown, but this application is not limited thereto.

In addition, in this specification, unless explicitly described to have an opposite meaning, the word "include" is understood as including the component, but not excluding any other component. In addition, in this specification, "on" means that a component is located above or below a target component, but does not mean that the component needs to be located on the top based on the direction of gravity.

To further describe the technical measures taken in this application to achieve the intended objectives and effects thereof, specific implementations, structures, features, and effects of calculation method for viewing-angle compensation of a display device, a viewing-angle compensation structure, and a display device provided according to this application are described below in detail with reference to the accompanying drawings and preferred embodiments.

FIG. 1 is a schematic diagram of a luminance gamma curve in a calculation method for viewing-angle compensation of a display device according to an embodiment of this application. As shown in FIG. 1, all tristimulus values for red, green, and blue displayed in grayscale of a display device in a viewing angle are measured, and include RXm, RYm, RZm, GXl, GYl, GZl, and BXn, BYn, BZn, where a stimulus value Y is a luminance gamma curve.

In this embodiment, for the tristimulus values, by using the CIE 1931 XYZ color space proposed by the CIE, in the color space, red, green, and blue are used as three primary colors, and all other colors can be formed by mixing the three primary colors. The CIE 1931 XYZ color space is usually represented by using the CIE 1931 chromaticity diagram. The CIE 1931 chromaticity diagram has three parameters, where the stimulus value Y represents brightness.

In this embodiment, m, l, and n=0, 1, 2, . . . , and 255.

In this embodiment, the viewing angle is a plurality of angles, including 0 degree, 30 degrees, 45 degrees, and 60 degrees.

In this embodiment, a horizontal coordinate scale is a primary color wavelength, and a vertical coordinate scale is the stimulus value Y, that is, a gamma value.

Figure 2:
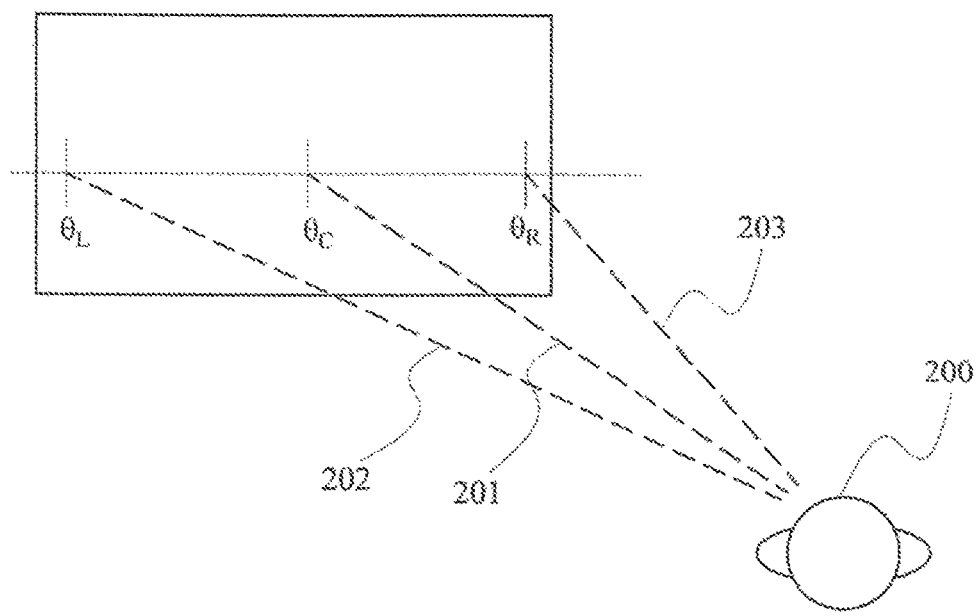
FIG. 2 is a schematic diagram of a viewing angle range in a calculation method for viewing-angle compensation of a display device according to an embodiment of this application.

FIG. 2 is a schematic diagram of a viewing angle range in a calculation method for viewing-angle compensation of a display device according to an embodiment of this application. As shown in FIG. 2, when a user 200 is at a central viewing angle ($\theta_c$) 201 facing a display device, a first viewing angle of a visible angle ($\theta_L$) 202 of the user 200 on a leftmost side of the display device is a maximum viewing angle, and a second viewing angle of a visible angle ($\theta_R$) 203 of the user 200 on a rightmost side of the display device is a minimum viewing angle. The first viewing angle and the second viewing angle are used to obtain a viewing angle range ($\theta_L$ to $\theta_R$) of an observation viewing angle.

Figure 3:
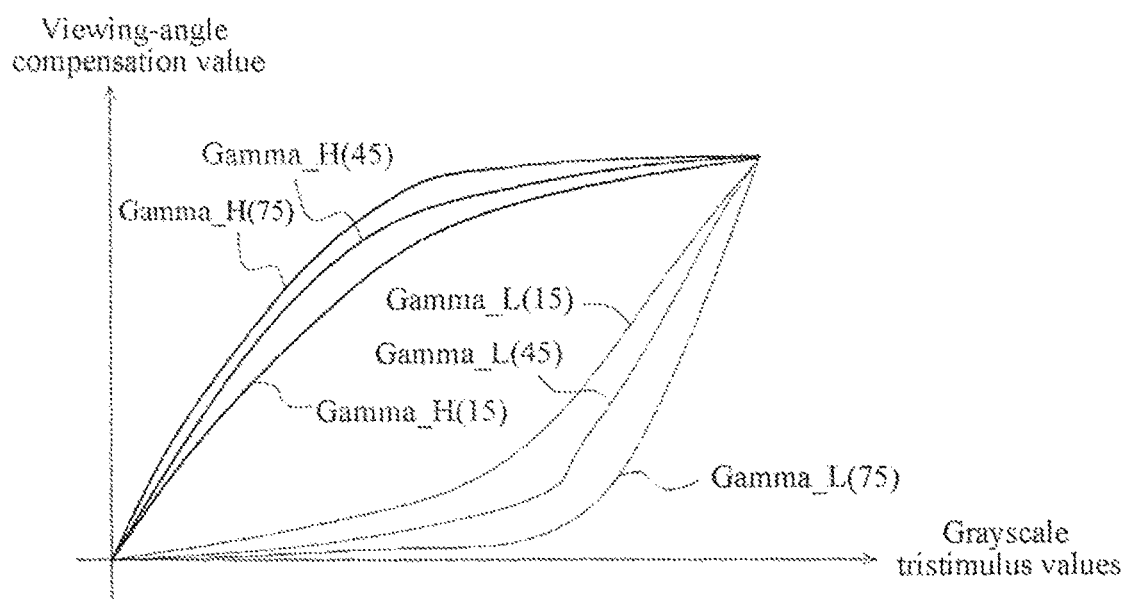
FIG. 3 is a schematic diagram of a display LUT in a calculation method for viewing-angle compensation of a display device according to an embodiment of this application.

FIG. 3 is a schematic diagram of a display LUT in a calculation method for viewing-angle compensation of a display device according to an embodiment of this application. As shown in FIG. 3, as the maximum viewing angle ($\theta_L$) and the minimum angle ($\theta_R$) of the user 200 that exist when the central viewing angle ($\theta_c$) is obtained are used to obtain the viewing angle range ($\theta_L$ to $\theta_R$) of the observation viewing angle in the description in FIG. 2, display LUTs of Gamma_H and Gamma_L corresponding to viewing angles are calculated by using a calculation formula of a viewing angle algorithm in the following and by introducing related parameters of the central viewing angle ($\theta_c$) and the viewing angle range ($\theta_L$ to $\theta_R$) into the following formulas:

Gamma_H(0-degree)+Gamma_L(0-degree)
=2*Gamma2.2(0-degree), and

Min(Gamma_H($\theta$)+Gamma_L($\theta$)−2*Gamma2.2(0-degree)).

In this embodiment, an angle ($\theta$) includes 15 degrees, 30 degrees, 45 degrees, 60 degrees, 75 degrees, and the like, and display LUTs of Gamma_H and Gamma_L of full angles can be calculated by using interpolation.

In this embodiment, a horizontal coordinate scale is a grayscale tristimulus value, and a vertical coordinate scale is a viewing-angle compensation value.

In this embodiment, the viewing angle is a plurality of angles, including 15 degrees, 45 degrees, and 75 degrees.

Figure 4:
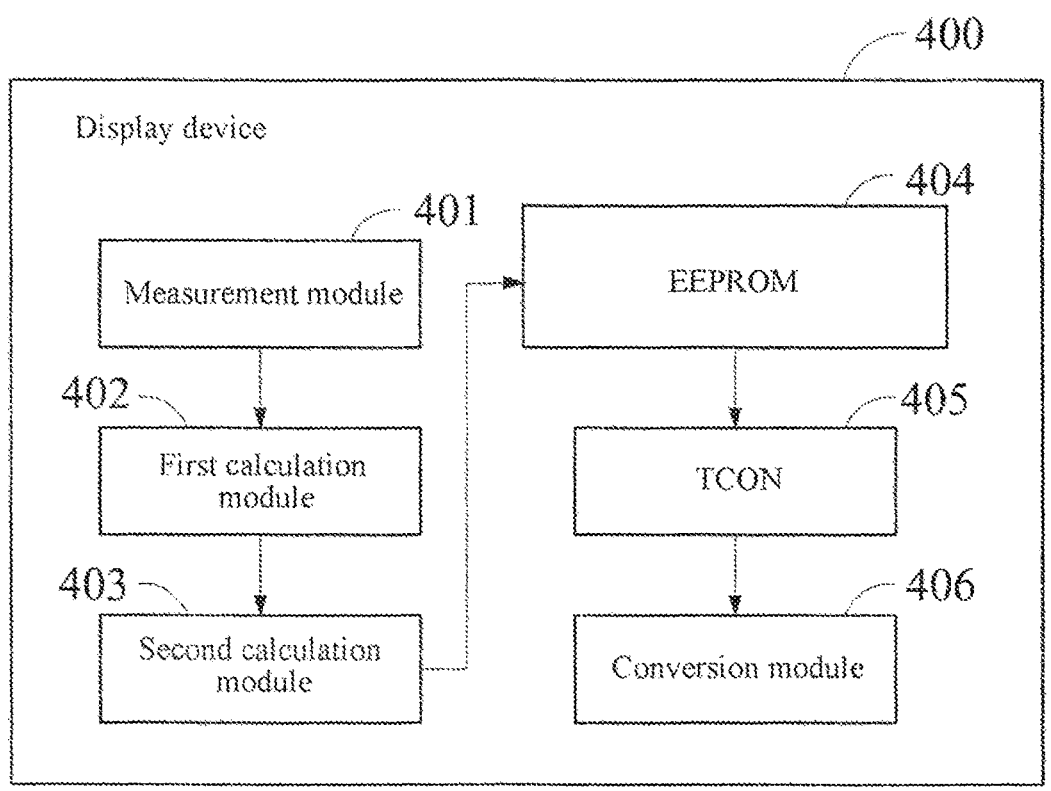
FIG. 4 is a schematic structural diagram of viewing-angle compensation according to an embodiment of this application.

FIG. 4 is a schematic structural diagram of viewing-angle compensation according to an embodiment of this application. As shown in FIG. 4, a color-shift adjustment structure includes a measurement module 401, a first calculation module 402, a second calculation module 403, an EEPROM 404, a TCON 405, and a conversion module 406. The measurement module 401 is configured to measure all tristimulus values for red, green, and blue displayed in grayscale of a display device 400 in a viewing angle and a luminance gamma curve. The first calculation module 402 is configured to calculate a central viewing angle, a first viewing angle, and a second viewing angle of an observation viewing angle of the display device 400, to obtain a viewing angle range of the observation viewing angle. The second calculation module 403 is configured to obtain a display LUT by using an angle of the viewing angle and the luminance gamma curve and according to a viewing angle algorithm. The EEPROM 404 is configured to store the display LUT. The TCON 405 is configured to: obtain a viewing-angle compensation value according to the display LUT of the EEPROM 404, and generate a source signal. The conversion module 406 is configured to convert the tristimulus values according to the source signal.

In this embodiment, the first calculation module calculates a difference between the first viewing angle and the second viewing angle to obtain the viewing angle range, where when the central viewing angle is obtained as a user faces the center of the display device, an angle at a longest distance from the display device is the first viewing angle, an angle at a nearest end from the display device is the second viewing angle, the first viewing angle is greater than the central viewing angle, and the central viewing angle is greater than the second viewing angle.

In this embodiment, the second calculation module calculates, by using a calculation formula of the viewing angle algorithm and by introducing related parameters of the central viewing angle and the viewing angle range into the following formulas, display LUTs of Gamma_H and Gamma_L corresponding to viewing angles:

Gamma_H(0-degree)+Gamma_L(0-degree)
=2*Gamma2.2(0-degree), and

Min(Gamma_H($\theta$)+Gamma_L($\theta$)−2*Gamma2.2(0-degree)), where

Gamma_H is a luminance gamma curve of a high-voltage pixel, and

Gamma_L is a luminance gamma curve of a low-voltage pixel.

Figure 5:
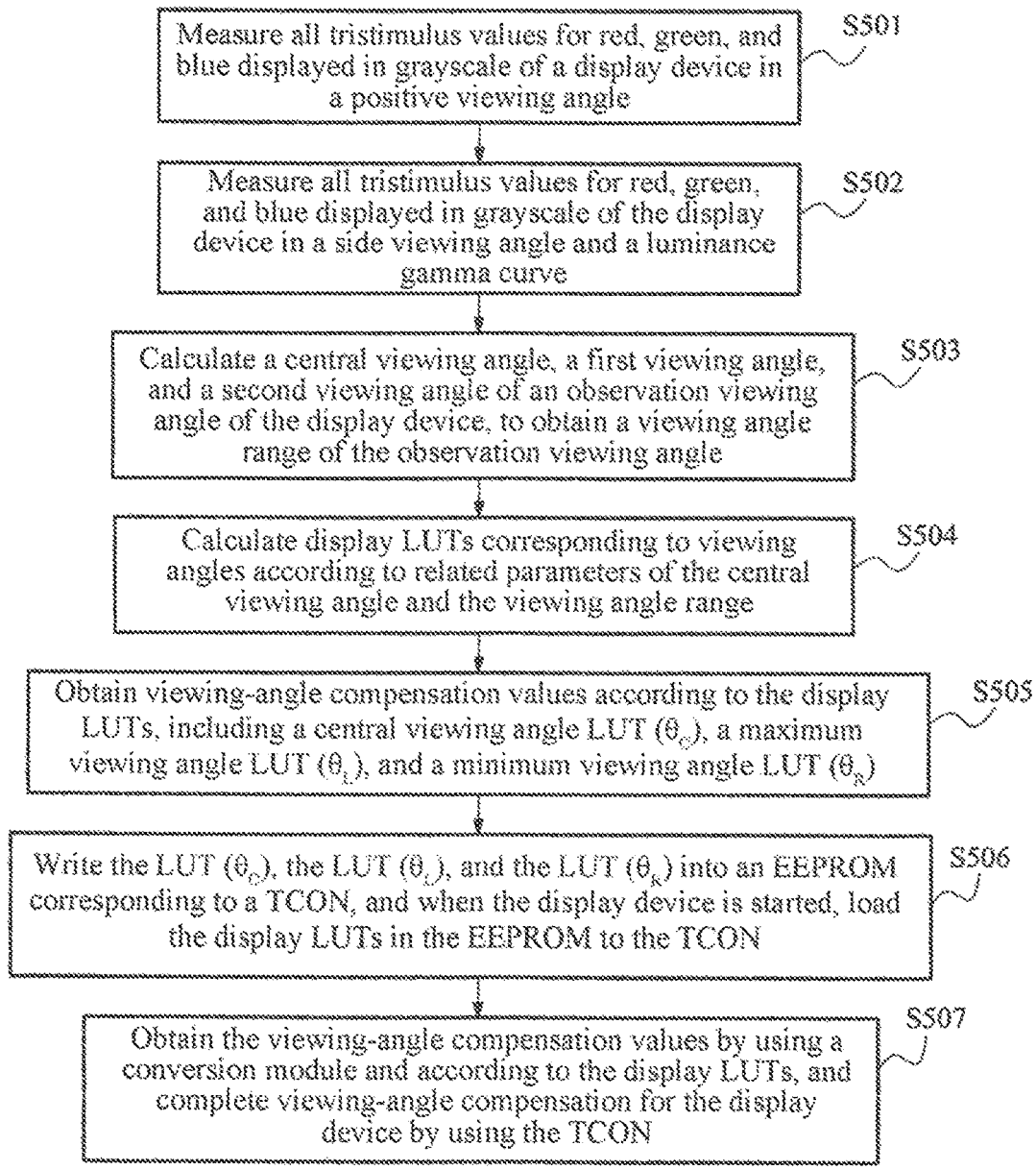
FIG. 5 is a flowchart illustrating a calculation method for viewing-angle compensation of a display device according to an embodiment of this application.

FIG. 5 is a flowchart illustrating a calculation method for viewing-angle compensation of a display device according to an embodiment of this application. Refer to the following description.

Step S501: Measure all tristimulus values for red, green, and blue displayed in grayscale of a display device in a positive viewing angle.

Step S502: Measure all tristimulus values for red, green, and blue displayed in grayscale of the display device in a side viewing angle and a luminance gamma curve.

In this embodiment, for the tristimulus values, by using the CIE 1931 XYZ color space proposed by the CIE, in the color space, red, green, and blue are used as three primary colors, and all other colors can be formed by mixing the three primary colors. The CIE 1931 XYZ color space is usually represented by using the CIE 1931 chromaticity diagram. The CIE 1931 chromaticity diagram has three parameters.

In this embodiment, the side viewing angle includes a plurality of angles having 15 degrees, 30 degrees, 45 degrees, 60 degrees, and 75 degrees.

In this embodiment, the tristimulus values include RXm, RYm, RZm, GXl, GYl, GZl, and BXn, BYn, BZn, where m, l, and n=0, 1, 2, . . . , and 255.

In this embodiment, the luminance gamma curve is a stimulus value Y of the tristimulus values.

Step S503: Calculate a central viewing angle, a first viewing angle, and a second viewing angle of an observation viewing angle of the display device, to obtain a viewing angle range of the observation viewing angle.

In this embodiment, when a user is at the central viewing angle ($\theta_c$) facing the display device, a first viewing angle of a visible angle ($\theta_L$) of the user on a leftmost side of the display device is a maximum viewing angle, and a second viewing angle of a visible angle ($\theta_R$) of the user on a rightmost side of the display device is a minimum viewing angle. The first viewing angle and the second viewing angle are used to obtain a viewing angle range of the observation viewing angle ($\theta_L$ to $\theta_R$).

Step S504: Calculate display LUTs corresponding to viewing angles according to related parameters of the central viewing angle and the viewing angle range.

In this embodiment, the display LUTs corresponding to the viewing angles are calculated by using a calculation formula of a viewing angle algorithm and by introducing the related parameters of the central viewing angle and the viewing angle range into the following formulas:

Gamma_H(0-degree)+Gamma_L(0-degree)
=2*Gamma2.2(0-degree), and

Min(Gamma_H($\theta$)+Gamma_L($\theta$)−2*Gamma2.2(0-degree)), where

Gamma_H is a luminance gamma curve of a high-voltage pixel, and

Gamma_L is a luminance gamma curve of a low-voltage pixel.

In this embodiment, the viewing angles may include 15 degrees, 30 degrees, 45 degrees, 60 degrees, 75 degrees, and the like, and display LUTs of full angles are calculated by using interpolation.

Step S505: Obtain viewing-angle compensation values according to the display LUTs, including a central viewing angle LUT ($\theta_c$), a maximum viewing angle LUT ($\theta_L$), and a minimum viewing angle LUT ($\theta_R$).

Step S506: Write the LUT ($\theta_c$), the LUT ($\theta_L$), and the LUT ($\theta_R$) into an EEPROM corresponding to a TCON, and when the display device is started, load the display LUTs in the EEPROM to the TCON.

In this embodiment, the TCON is configured to generate a data signal (an electrode wire X) and a position signal (an electrode wire Y) for driving the arrangement of pixels of the display device.

In this embodiment, by using interpolation, a viewing-angle compensation value corresponding to each data signal required by the TCON is obtained. A full high-definition (FHD) display device is used as an example. There are a LUT (S1) to a LUT (S1920). S1 represents a first source signal, S2 represents a second source signal, and the like.

In this embodiment, the LUT ($\theta_L$) corresponds to the LUT (S1), the LUT ($\theta_c$) corresponds to the LUT (S960), the LUT ($\theta_R$) corresponds to the LUT (S1920), and the rest LUT signals are calculated by using the TCON by using interpolation.

Step S507: Obtain the viewing-angle compensation values by using a conversion module and according to the display LUTs, and complete viewing-angle compensation for the display device by using the TCON.

In this embodiment, a display LUT corresponding to an S1 signal is the LUT (S1), a display LUT corresponding to an S2 signal is the LUT (S2), and the like.

In this embodiment, the tristimulus values are converted according to a source signal.

An embodiment of this application further provides a display device. The display device includes a display panel, the display panel including a plurality of pixels, and configured to display an image, and includes: a measurement module, configured to measure all tristimulus values for red, green, and blue displayed in grayscale of the display device in a viewing angle and a luminance gamma curve; a first calculation module, configured to calculate a central viewing angle, a first viewing angle, and a second viewing angle of an observation viewing angle of the display device, to obtain a viewing angle range of the observation viewing angle; a second calculation module, configured to obtain a display LUT by using an angle of the viewing angle and the luminance gamma curve and according to a viewing angle algorithm; an EEPROM, configured to store the display LUT; a TCON, configured to: obtain a viewing-angle compensation value according to the display LUT of the EEPROM, and generate a source signal; and a conversion module, configured to convert the tristimulus values according to the source signal.

In conclusion, this application provides a viewing-angle compensation algorithm for displays, so that viewing angle characteristics of the displays can be optimized. As liquid crystal displays become increasingly large, observation angles of a user at different positions are different, and even if the user is at a particular position, a viewing angle of the user relative to a screen already covers more than one angle ($\theta_L$ and $\theta_R$), as shown in FIG. 3. Generally, a viewing-angle compensation algorithm technology is used to perform color compensation for a viewing angle, and viewing angles from other angles relatively have errors. Therefore, this application provides an optimized viewing-angle compensation technology. The optimized viewing-angle compensation technology can compensate for viewing angle characteristics of a plurality of angles, and can perform optimal viewing-angle compensation by means of this application regardless of the size of a display.

The terms such as "in some embodiments of this application" and "in various embodiments" are repeatedly used. The terms usually refer to different embodiments, but they may also refer to a same embodiment. The words, such as "comprise", "have", and "include", are synonyms, unless other meanings are indicated in the context thereof.

Descriptions above are merely preferred embodiments of this application, and are not intended to limit this application in any form. Although this application has been disclosed above in forms of preferred embodiments, the embodiments are not intended to limit this application. A person skilled in the art can make some equivalent variations, alterations or modifications to the above disclosed technical content without departing from the scope of the technical solutions of the above disclosed technical content to obtain equivalent embodiments. Any simple alteration, equivalent change or modification made to the foregoing embodiments according to the technical essence of this application without departing from the content of the technical solutions of this application shall fall within the scope of the technical solutions of this application.

What is claimed is:

1. A calculation method for viewing-angle compensation of a display device, comprising:
    measuring tristimulus values for red, green, and blue displayed in grayscale of a display device in a viewing angle and a luminance gamma curve;
    calculating a central viewing angle, a first viewing angle, and a second viewing angle of an observation viewing angle of the display device, to obtain a viewing angle range of the observation viewing angle;
    obtaining a display look-up table (LUT) by using an angle of the viewing angle and the luminance gamma curve and according to a viewing angle algorithm;
    obtaining a viewing-angle compensation value by using the central viewing angle and the viewing angle range and according to the display LUT; and
    adjusting the corresponding tristimulus values in the display device according to the viewing-angle compensation value;
    wherein the display LUT corresponding to the viewing angle is calculated by using a calculation formula of the viewing angle algorithm and by introducing related parameters of the central viewing angle and the viewing angle range into the following formulas:

$$\text{Gamma\_H(0-degree)+Gamma\_L(0-degree)} = 2*\text{Gamma2.2(0-degree)}, \text{ and}$$

$$\text{Min(Gamma\_H}(\theta)+\text{Gamma\_L}(\theta)-2*\text{Gamma2.2(0-degree))}, \text{ wherein}$$

Gamma_H is a luminance gamma curve of a high-voltage pixel, and

Gamma_L is a luminance gamma curve of a low-voltage pixel.

2. The calculation method for viewing-angle compensation of a display device according to claim 1, wherein the viewing angle comprises 0 degree, 15 degrees, 30 degrees, 45 degrees, 60 degrees, and 75 degrees.

3. The calculation method for viewing-angle compensation of a display device according to claim 2, wherein the 0 degree viewing angle is a positive viewing angle.

4. The calculation method for viewing-angle compensation of a display device according to claim 1, wherein the luminance gamma curve is a stimulus value Y of the tristimulus values.

5. The calculation method for viewing-angle compensation of a display device according to claim 1, wherein the viewing angle range is a difference between the first viewing angle and the second viewing angle when the central viewing angle is obtained as a user faces the center of the display device.

6. The calculation method for viewing-angle compensation of a display device according to claim 5, wherein an angle at a longest distance from the display device is the first viewing angle, an angle at a nearest end from the display device is the second viewing angle, the first viewing angle is greater than the central viewing angle, and the central viewing angle is greater than the second viewing angle.

7. The calculation method for viewing-angle compensation of a display device according to claim 1, wherein the display LUT calculates a LUT corresponding to a full display comprising the viewing angle by using interpolation.

8. A viewing-angle compensation structure, comprising:
    a measurement module, configured to measure all tristimulus values for red, green, and blue displayed in grayscale of a display device in a viewing angle and a luminance gamma curve;
    a first calculation module, configured to calculate a central viewing angle, a first viewing angle, and a second viewing angle of an observation viewing angle of the display device, to obtain a viewing angle range of the observation viewing angle;
    a second calculation module, configured to obtain a display look-up table (LUT) by using an angle of the viewing angle and the luminance gamma curve and according to a viewing angle algorithm;
    an electrically-erasable programmable read-only memory (EEPROM), configured to store the display LUT;
    a timing controller (TCON), configured to: obtain a viewing-angle compensation value according to the display LUT of the EEPROM, and generate a source signal; and
    a conversion module, configured to convert the tristimulus values according to the source signal;
    wherein the second calculation module calculates using a calculation formula of the viewing angle algorithm and introducing related parameters of the central viewing angle and the viewing angle range into the following formulas, the display LUT corresponding to the viewing angle:

$$\text{Gamma\_H(0-degree)+Gamma\_L(0-degree)} = 2*\text{Gamma2.2(0-degree)}, \text{ and}$$

$$\text{Min(Gamma\_H}(\theta)+\text{Gamma\_L}(\theta)-2*\text{Gamma2.2(0-degree))}, \text{ where}$$

Gamma_H is a luminance gamma curve of a high-voltage pixel, and

Gamma_L is a luminance gamma curve of a low-voltage pixel.

9. The viewing-angle compensation structure according to claim 8, wherein the first calculation module calculates a difference between the first viewing angle and the second viewing angle to obtain the viewing angle range, wherein when the central viewing angle is obtained as a user faces the center of the display device, an angle at a longest distance from the display device is the first viewing angle, and an angle at a nearest end from the display device is the second viewing angle.

10. The viewing-angle compensation structure according to claim 9, wherein the first viewing angle is greater than the central viewing angle, and the central viewing angle is greater than the second viewing angle.

11. The viewing-angle compensation structure according to claim 8, wherein the viewing angle comprises 0 degree, 15 degrees, 30 degrees, 45 degrees, 60 degrees, and 75 degrees.

12. The viewing-angle compensation structure according to claim 11, wherein the 0 degree viewing angle is a positive viewing angle.

13. The viewing-angle compensation structure according to claim 8, wherein the luminance gamma curve is a stimulus value Y of the tristimulus values.

14. A display device, comprising a display panel, the display panel comprising a plurality of pixels, and configured to display an image, and a viewing-angle compensation structure, comprising:
- a measurement module, configured to measure all tristimulus values for red, green, and blue displayed in grayscale of the display device in a viewing angle and a luminance gamma curve;
- a first calculation module, configured to calculate a central viewing angle, a first viewing angle, and a second viewing angle of an observation viewing angle of the display device, to obtain a viewing angle range of the observation viewing angle;
- a second calculation module, configured to obtain a display look-up table (LUT) by using an angle of the viewing angle and the luminance gamma curve and according to a viewing angle algorithm;
- an electrically-erasable programmable read-only memory (EEPROM), configured to store the display LUT;
- a timing controller (TCON), configured to: obtain a viewing-angle compensation value according to the display LUT of the EEPROM, and generate a source signal; and
- a conversion module, configured to convert the tristimulus values according to the source signal;

wherein the second calculation module calculates, according to by using a calculation formula of the viewing angle algorithm and by introducing related parameters of the central viewing angle and the viewing angle range into the following formulas, the display LUT corresponding to the viewing angle:

$$\text{Gamma\_H}(0\text{-degree}) + \text{Gamma\_L}(0\text{-degree}) = 2*\text{Gamma2.2}(0\text{-degree}), \text{ and}$$

$$\text{Min}(\text{Gamma\_H}(\theta) + \text{Gamma\_L}(\theta) - 2*\text{Gamma2.2}(0\text{-degree})), \text{ where}$$

Gamma_H is a luminance gamma curve of a high-voltage pixel, and
Gamma_L is a luminance gamma curve of a low-voltage pixel.

* * * * *